Patented Apr. 1, 1952

2,591,245

UNITED STATES PATENT OFFICE 2,591,245

ALUMINUM PASTE PIGMENT

Junius D. Edwards, Oakmont, Pa., assignor to Aluminum Company of America, Pittsburgh, Pa., a corporation of Pennsylvania No Drawing. Application August 11, 1948, Serial No. 43,760

5 Claims. (Cl. 106—290)

This invention relates in general to improvements in the production of metallic pigments suitable for use in the manufacture of paints, inks and coating compositions, and is more particularly concerned with the processing of aluminum paste pigments to impart improved reflectivity and stability to such products.

It is a primary object of the invention to provide a method or methods of processing metallic pigments in paste form, as a step or series of steps in their manufacturing process, wherein the addition of a pigment leafing agent is a controlling factor.

The invention is primarily concerned with aluminum base pigments and is described in detail in respect thereto. It should not be limited in its application to aluminum, since other metals and their alloys will respond and be improved, when treated in accordance with the invention.

There are numerous processes in commercial use for producing metallic pigments of the desired fineness to provide acceptable paint products. The process described in United States Patent 2,002,891, issued May 23, 1935, to Everett J. Hall, is one which has received wide acceptance and is commercially termed a wet process in that comminution of the metallic pigment is carried out in a ball mill in a solution of leaf producing agents, such as stearic acid and palmitic acid, and a volatilizable hydrocarbon, such as mineral spirits, to produce a metallic pigment in the form of a sludge-like mass or paste characterized by the individual metallic flakes being coated with a film of the leaf producing agent.

The sludge discharged from the ball mill is filtered to remove a portion of the liquid phase and provide an aluminum pigment cake of approximate composition by weight, about 80 per cent metal flake with the balance mineral spirits containing a small amount of dissolved leafing agent. In present practice, the cake is thereafter adjusted by the addition of a solution of clean mineral spirits and leafing agent to an approximate composition by weight, 60 to 65 per cent aluminum flake. This adjusted product is presently sold as a widely known leafing aluminum paste pigment for subsequent admixture with suitable paint vehicles in the manufacture of aluminum paint. The adjustment from filter cake to the marketed product (60 to 65 per cent aluminum flake paste) is usually carried out in a standard commercial mixer of the single blade, cylindrical housing type.

The present invention involves the introduction of a new and novel step, or steps, in aluminum past pigment manufacture, which may be practiced with beneficial results on paste pigments of the order by weight, 68 to 85 per cent aluminum flake.

The new and novel feature of the invention is directed to a wet polishing procedure for leaf producing paste pigments, or slurries, of the stated 68 to 85 per cent metal flake content, in the presence of an addition of free leafing agent as a separate solid phase, as distinguished from leafing agent present in solution. The mere presence of the added leafing agent as a solid phase, or in solid form, is not sufficient in itself to impart the improved benefits of the invention. The wet polishing operation must also be performed on the paste, adjusted to include the added solid phase leafing agent, to bring about a distribution of some of the added solid leafing agent on the surfaces of the already coated metallic flakes. A wet polishing operation that insures repeated rubbing of the solid leafing agent against the coated metal flakes, is important to my invention. A two-bladed industrial mixer, incorporating a pair of sigmoidal-shaped blades, that preferably rotate inwardly towards the central longitudinal axis of a cylindrical shell housing the blades, has also been found satisfactory for producing the wet polishing rubbing action that is herein contemplated. It should be understood that other commercial forms of apparatus, such as a burr mill, may be substituted for the industrial mixer for carrying out the wet polishing operation.

The solid phase leafing agent may be added to the paste pigments in the form of solid stearic acid or mixtures thereof with palmitic acid, or other suitable leafing agents, or it may be added in the form of these leafing agents suspended or dispersed in mineral spirits, or other volatile hydrocarbons, and mixtures thereof. It is also possible to dissolve solid leafing agent in a limited amount of mineral spirits, as by heating a mixture of the same, and then permitting the mixture to cool to permit the separation of solid leafing agent to make it available for the subsequent wet polishing. Leafing agents in amounts between 1 and 4 per cent, expressed in terms of the total weight of aluminum paste pigments, have been found satisfactory in the practice of the invention.

As previously stated in this specification, the wet polishing treatment has been defined in terms of a repeated rubbing action between the metal flakes of a pigment paste formulation, in the presence of an added leafing agent in solid phase, to polish the individual flakes and apply a further coating of solid phase leafing agent on the film bearing surfaces of the flakes.

It is not essential that a single step introduction of the solid phase leafing agent be employed, nor is it necessary to carry out the wet polishing treatment without interruption. Periods of wet polishing, whether continuous or interrupted, ranging from about 1 to 12 hours total expired time, have been found satisfactory, with substantial improvement being obtained within the lower time range of any selected wet polishing cycle, as measured in terms of improved stability and reflectivity in the pigments so treated, regardless of whether the solid phase leafing agent was added all at one time, or intermittently.

It is not essential that the leafing agent be present as a solid during an entire wet polishing cycle. For example, the wet polishing treatment is normally accompanied by a temperature rise which tends to dissolve some of the solid phase leafing agent in the liquid phase of the paste pigment formulation, particularly as a wet polishing cycle progresses. In this connection, an upper temperature limit of 110° F. should not be exceeded. It is essential to the benefits of the invention, however, that the solid phase leafing agent be present during a sufficient portion of a wet polishing cycle as to insure a substantial period of rubbing between the solid leafing agent and metallic flakes, as well as the distribution of an effective quantity of the added solid leafing agent on the surfaces of the flakes.

In a commercial application of the method of the invention, leafing paste formulations of compositions by weight ranging between 68 and 85 per cent aluminum flakes and 14 to 28 per cent mineral spirits, with stearic acid in solution, were wet polished for periods from about 1 to 12 hours in the presence of added solid stearic acid for a substantial period of the various wet polishing cycles falling within the stated wet polishing range. In all instances, the resulting wet polished paste pigment formulations exhibited improved stability, brightness and specular reflectivity, when measured in terms of leafing paste pigments that had not been wet polished in accordance with the method of the invention.

Paste pigments, treated in accordance with the practices of the invention described above, may be adjusted to any desirable metallic flake and leafing agent content following the wet polishing treatment. Whether or not the paste pigments are further adjusted in composition, the products are in condition, following wet polishing, for packaging and subsequent admixture with suitable paint vehicles, such as varnish. The paste pigments thus treated may also be converted to dry powder pigments by driving off the volatile hydrocarbons.

A conventional leafing paste pigment, produced without benefit of the wet polishing procedure of the invention, and having a nominal composition by weight, 63 per cent aluminium flakes, 2 per cent stearic acid, and 35 grams of mineral spirits was mixed with a varnish vehicle to form a paint and applied to a steel panel. The diffusely reflected light measurement for this panel was 19 per cent, as obtained by a standard Hunter multipurpose reflectometer, which is described in the National Bureau of Standards Journal of Research, vol. 25, pages 581–618, November 1940.

A paste pigment produced and treated in accordance with the wet polishing procedure of the invention, and having a nominal composition by weight, 72 per cent aluminum flakes, 2.25 per cent stearic acid, and 25.75 per cent mineral spirits, was mixed to the same formulation using the same varnish vehicle and the same pigment concentration as employed with the conventional paste pigment described above, and applied to a steel panel. Using the Hunter multipurpose reflectometer, the diffusely reflected light was only 14 per cent and the panel exhibited a brighter and more metallic appearance.

Stability tests on ready mixed paints were also conducted to compare the conventional paste pigments with pigments produced in accordance with the practice of the invention. An alkyd resin vehicle was selected for the vehicle portion of the ready mixed aluminum paints, since this particular type of vehicle was known to present a problem in leaf stability of ready mixed paints. A ready mixed paint made from conventional paste pigment of 65 per cent aluminum flake content exhibited an initial leaf of 64 per cent, which dropped to zero leaf after three months storage. A ready mixed paint made to the same formula from paste pigment of 74 per cent aluminum flake content, which was produced in accordance with the practice of the invention, exhibited an initial leaf of 68 per cent and only dropped to 51 per cent after three months storage. In both cases the ready mixed paints contained 14.5 per cent aluminum flake pigment, based on the total weight of ready mixed paint.

What is claimed is:

1. In the production of aluminum paste pigment characterized by improved stability, brightness and specular reflectivity, the process of subjecting a mixture comprising a main body of 68 to 85 per cent aluminum flakes, coated with a leaf-producing agent in the presence of about 14 to 28 per cent mineral spirits containing dissolved stearic acid, to a wet polishing operation effected by adding solid stearic acid in amounts between 1.0 to 4.0 per cent of the total weight of the pigment and stirring the mixture so that flake rubs against flake for a period of about 1 to 12 hours, while maintaining the temperature below about 110° F.

2. An aluminum paste pigment formulation comprising a main body of leafing aluminum flakes constituting from 68 to 85 per cent of the paste, about 1.0 to 4.0 per cent leafing agent, and about 14 to 28 per cent mineral spirits, said flakes having been wet polished for a period of about 1 to 12 hours at a temperature not exceeding 110° F. in the presence of at least one of an added solid leafing agent of the group consisting of stearic and palmitic acids to effect substantial improvement in brightness, specular reflectivity and leaf stability.

3. In the production of aluminum paste pigment characterized by improved stability, brightness and specular reflectivity, the process of subjecting a mixture comprising a main body of 68 to 85 per cent aluminum flakes, coated with a leaf-producing agent and moistened with about 14 to 28 per cent by weight of mineral spirits, to a wet polishing operation for a period of about 1 to 12 hours in the presence of mixtures of stearic and palmitic acids added in solid phase in amounts between 1.0 to 4.0 per cent of the total weight of the pigment, while maintaining an operating temperature below about 110° F.

4. An aluminum paste pigment formulation comprising a main body of leafing aluminum flakes constituting from 68 to 85 per cent of the paste, about 14 to 28 per cent mineral spirits, and at least one leafing agent of the group consisting of stearic and palmitic acids, said leafing agent having been added at least in part in solid phase in amounts between 1.0 to 4.0 per cent of the total weight of the pigment formulation and the paste formulation wet polished for a period of about 1 to 12 hours at a temperature below about 110° F., and said pigment formulation being characterized by improved stability, brightness and specular reflectivity.

5. In the production of aluminum paste pigment characterized by improved stability, brightness and specular reflectivity, the process of subjecting a mixture comprising a main body of 68 to 85 per cent aluminum flakes, coated with a leaf-producing agent and moistened with about 14 to 28 per cent by weight of mineral spirits, to a wet polishing operation for a period of about 1 to 12 hours in the presence of at least one leafing agent selected from the group consisting of palmitic and stearic acids added in solid phase in amounts between 1 to 4 per cent of the total weight of the pigment, while maintaining an operating temperature below 110° F.

JUNIUS D. EDWARDS.

REFERENCES CITED

The following references are of record in the file of this patent:

UNITED STATES PATENTS

| Number | Name | Date |
| --- | --- | --- |
| 2,144,953 | Ziehl | Jan. 24, 1939 |
| 2,193,663 | Arthur | Mar. 12, 1940 |

OTHER REFERENCES

Aluminum Paint and Powder, Edwards, 2nd ed., Reinhold Pub. Co., New York, N. Y. 1936.